(12) United States Patent
Wu et al.

(10) Patent No.: US 10,469,706 B2
(45) Date of Patent: Nov. 5, 2019

(54) FULL COLOR, DIGITALLY PRINTED COPY EVIDENT DOCUMENTS

(71) Applicant: HAM LTD, Markham (CA)

(72) Inventors: Judy Wailing Wu, Markham (CA); Gregory Richard Wolfe, Kittanning, PA (US)

(73) Assignee: HAM LTD, Markham, Ontario (CA)

( * ) Notice: Subject to any disclaimer, the term of this patent is extended or adjusted under 35 U.S.C. 154(b) by 0 days.

(21) Appl. No.: 16/146,477

(22) Filed: Sep. 28, 2018

(65) Prior Publication Data

US 2019/0109961 A1 Apr. 11, 2019

Related U.S. Application Data

(60) Provisional application No. 62/568,545, filed on Oct. 5, 2017.

(51) Int. Cl.
| | |
|---|---|
| H04N 1/405 | (2006.01) |
| H04N 1/52 | (2006.01) |
| H04N 1/44 | (2006.01) |
| H04N 1/40 | (2006.01) |
| H04N 1/00 | (2006.01) |

(52) U.S. Cl.
CPC ....... *H04N 1/4051* (2013.01); *H04N 1/00883* (2013.01); *H04N 1/405* (2013.01); *H04N 1/40075* (2013.01); *H04N 1/4446* (2013.01); *H04N 1/52* (2013.01)

(58) Field of Classification Search
CPC ............. H04N 1/4051; H04N 1/00883; H04N 1/4446; H04N 1/40075; H04N 1/52
See application file for complete search history.

(56) References Cited

U.S. PATENT DOCUMENTS

| | | |
|---|---|---|
| 4,108,654 A | 8/1978 | Goren |
| 7,286,682 B1 | 10/2007 | Sharma et al. |
| 2003/0038974 A1 | 2/2003 | Hu |
| 2009/0245613 A1 | 10/2009 | Wu et al. |
| 2011/0310404 A1 | 12/2011 | Simske et al. |

OTHER PUBLICATIONS

Written Opinion of the International Searching Authority for PCT/US18/53473, dated Nov. 26, 2018.

*Primary Examiner* — Christopher Wait
(74) *Attorney, Agent, or Firm* — Beth A. Filip; Raymond J. Vivacqua; Steven L. Crane

(57) ABSTRACT

A copy-evident document and a method of printing a copy-evident document wherein a void pantograph is created including a first set of halftone elements and a second set of halftone elements different in modulation from the first set of halftone elements. An overlay including a white image with a plurality of halftone hole locations is preferably formed, wherein the halftone elements of the void pantograph are converted to the plurality of halftone hole locations. The overlay is then preferably merged with a background image, such that portions of the background image are visible at the halftone hole locations of the overlay when printed. The merged image is then printed on print media, wherein the portions of the background image that are printed are printed at locations where the holes locations are present in the overlay creating a copy-evident feature.

20 Claims, 14 Drawing Sheets

(9 of 14 Drawing Sheet(s) Filed in Color)

130

100'

110

112

102'

104'

130

130

134

134

FULL COLOR, DIGITALLY PRINTED COPY EVIDENT DOCUMENTS

CROSS-REFERENCE TO RELATED APPLICATIONS

The present application claims the benefit of the filing date of U.S. Provisional patent application No. 62/568,545 filed on Oct. 5, 2017, the teachings of which are incorporated herein by reference.

FIELD

The present disclosure is directed to full color, digitally printed copy evident documents, systems of providing such documents, and methods of creating such documents.

BACKGROUND

Digitally printed original documents may incorporate numerous forms of security features to verify the authenticity of the original documents as originals. Such security features may include microprint, void pantographs, watermarks, guilloche, verification grids, covert security such as HALO image (available from ARCIS Solutions Inc.), feature registration on opposing sides of paper and latent images view-able using special filters. These features can be embedded into a document, wherein the feature may not be visible to the casual observer and often requires some degree of manipulation to be seen. For example, photocopying or scanning may reveal void pantographs and may alter or eliminate microprint, verification grids, watermarks, and guilloche images; special lenses or filters may reveal covert images or alter Halo images.

Of the techniques noted above, void pantographs are commonly used. In the past, this feature can only be produced using standard press printing processes such as, but not limited to, offset web and sheet fed printing (lithography), letterpress, flexographic, intaglio and gravure. The press printing processes may include generating film or plate, as in the case of CTP (computer to plate), at very high resolution usually at 2400 or 2540 dpi (dots per inch) and beyond; to produce patterns of dots, lines, screen structures or the likes that is required in a void pantograph. Recently, advancements have been made in void pantograph creation (such as described in but not limited to U.S. Pat. Nos. 7,307,761; 7,869,090; 8,164,799; 8,405,882; 8,593,698; 8,743,425; 8,817,330; 8,891,136; 9,738,106; etc.), so that this feature can be printed using laser printers (including laser copier/printer), ink-jet printers, direct image presses, production digital presses and combinations thereof, such as the Canon ColorStream, i300, VP 6000, VP10000, Ricoh InfoPrint 5000, 40000, 60000, HP Indigo, Screen Truepress series, Xeikon, and the Xerox IGen, Rialto 900, Brenva, Fiji J Press, at lower resolutions, as low as 300 dots per inch, and up.

Void pantographs utilize halftone elements, such as dots or lines, varying in size or spacing to form halftones that provide the visual appearance of a continuous tone or color gradients. The halftone elements provide a covert copy evident feature, which appears when the document is reproduced. The alteration of the size and placement of the elements in the halftones may trick the optic engine of copy machines and scanners. In embodiments, at least one set of the halftone elements is difficult to reproduce using these methods. Accordingly, when reproduced, a portion of the elements (such as the larger elements or elements placed more closely together are reproduced in a manner that makes them stand out from the continuous tone of the void pantograph due to, for example, a failure to reproduce the remainder of the elements, which dropout. This may reveal words such as "COPY", "VOID", "INVALID" or images such as logos upon copying.

However, as noted above, void pantographs are generally applied to a document as a background and appear to be a continuous tone of one color or it's tonal gradients, where text and other graphics appear on top of such a background to form a finished document such as a check, permits, coupon, transcript, etc. Sometimes, the void pantograph is provided in what would appear to the casual observer as a flat tint or one uniform color and may sometimes include a camouflage pattern on top of a flat tint to create a regular or irregular texture.

Void pantographs for the digital printing platform are not understood to provide images that exhibit numerous colors, saturation levels, and brightness values visible to the casual observer as it is difficult to provide both the image and the copy-evident features of the void pantograph. In addition, even when void pantographs are provided in patterns, textures, and images, they generally require careful configuration to keep the void pantograph covert and maintain its effectiveness upon reproduction. Therefore, only a few patterns and textures are generally available and it is difficult to fully customize the images visible to the casual observer upon replication. Thus, there remains room for improving the provision of void pantographs in documents to improve their customizability and variability.

SUMMARY

An aspect of the present disclosure relates to a method of printing a copy evident document. In the method, preferably, a void pantograph is created including a first set of halftone elements and a second set of halftone elements different in modulation from the first set of halftone elements. An overlay including a white image with a plurality of halftone hole locations is preferably formed, wherein the halftone elements of the void pantograph are converted to the plurality of halftone hole locations. The overlay is then preferably merged with a background image, such that portions of the background image are visible at the halftone hole locations of the overlay when printed. The merged image is then printed on print media, wherein the portions of the background image that are printed are printed at locations where the holes locations are present in the overlay creating a copy-evident feature.

Another aspect of the present disclosure is directed to a method of printing a copy evident document. The method preferably includes printing a plurality of visible portions of a background image merged with a overlay on a document, wherein the visible portions of the background image are defined by a first set of halftone holes and a second set of halftone holes different in modulation from said first halftone holes in the overlay and the visible portions of the background image provide a copy-evident feature on the document.

Yet a further aspect of the present disclosure relates to a copy-evident document including a covert-security feature. The document includes a merged image printed on the document. The merged image preferably includes a background image and an overlay wherein the overlay includes a first set of halftone holes and a second set of halftone holes different in modulation from said first set of halftone holes and portions of the background image is printed where the first and second sets of halftone holes are present in the overlay.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above-mentioned and other features and advantages of the present disclosure, and the manner of attaining them, will become appreciated and be more readily understood by reference to the following detailed description in conjunction with the accompanying drawings, wherein.

DETAILED DESCRIPTION

Figure 1:
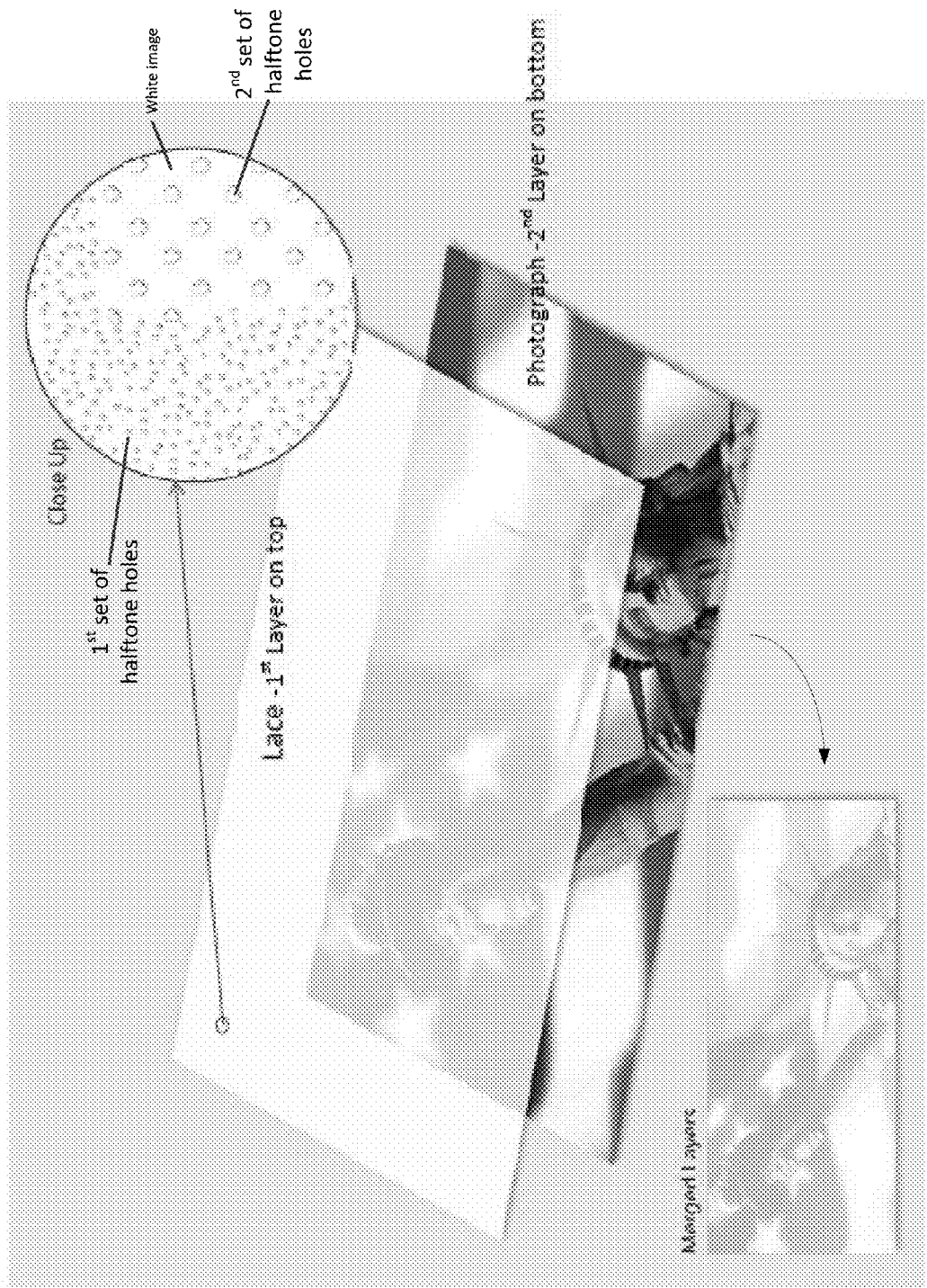
FIG. 1 is an illustration of an overlay and a background image, in this case a photograph. A close-up of the overlay is illustrated including two sets of halftone holes. Also illustrated is the merged image of the overlay and background image. The result is a muted version (reduction in density level) of the original background image incorporating the copy-evident security feature.

The present disclosure is directed to full color, digitally printed copy evident documents, systems of providing such documents, and methods of creating such documents. The copy evident documents include void pantographs. As illustrated in FIG. 1, generally, the copy evident documents are provided by creating a solid white "overlay" image in a manner similar to the placement of lace over an object or image. The overlay includes at least a first set of halftone holes and a second set of halftone holes, different from the first set of halftone holes. For example, as illustrated in the close-up image provided in FIG. 1, the first set of halftone holes may be smaller in size than the second set of halftone holes. When the overlay is imposed on top of, or merged with, a continuous tone background image containing a) a single solid color (FIG. 6a), b) multiple colors (FIG. 7a), or c) a full color image understood to include information regarding all four colors (CMYK) in each pixel, such as photographic or vector art (FIG. 8a, FIG. 8b), the white overlay will mute and reduce the density level of the original background images (such as the background images illustrated in FIGS. 6a, 7a, 8a and 8b). Within a background image described in FIGS. 6a, 7a, 8a and 8b, it can also include an identifier such as alpha and/or numeric number and/or a hashcode in a separate or different color than its surrounding color as part of the background image. A hashcode may be understood herein as a fixed number of characters such as alpha, numeric, ASCII, Unicode, or combinations thereof generated using an algorithm, and preferably a product sum algorithm, over the entire text of the string from variable data, fixed data, or both variable and fixed data, the data being found, e.g., in the document contents, document properties, or an electronic file the document represents.

Figure 11:
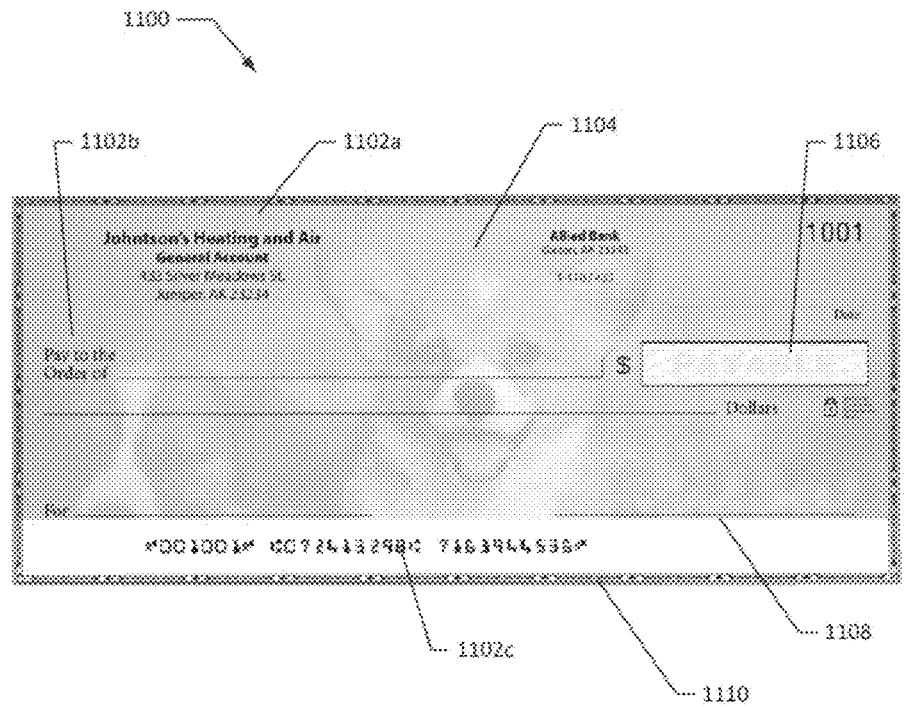
FIG. 11 is an embodiment of a document including a copy evident feature along with variable data that was printed together in a single pass using digital printing equipment.

The background image, and its color information, is only visible through the halftone hole locations in the overlay. The merged layers become the printed image (see, e.g., the merged layers of FIG. 1). When printed, the printing medium (ink, toner, dyes, pigments, etc.) is deposited only at locations that correspond to the halftone holes in the overlay as the white portion of the merged image is not printed by the printer. Such documents may be printed using digital printing platforms, such as laser printers, laser printer/copiers, ink-jet printers, and production digital presses, at any resolution, such as 300 dpi or greater, and after electronic copying by a photocopier or scanner, the original document appear different from the copied vision. While not illustrated in FIG. 1, text or other graphics may be printed over the copy-evident feature as illustrated in FIG. 11 and described further below. The copy-evident features and any additional text or graphics may be printed all at the same time in a single pass of the document through the printer. The document may include any print media, such as paper, fabric, film, plastic, etc. While the copy-evident feature is illustrated as covering nearly the entire surface area of the print media, it may cover the entire surface area or just a portion of the surface area, such as in the range of 1% to 100%, and all values and ranges therein such as 10% to 50%, 10% to 75%, 10% to 90%, 5%, 10%, 20%, 50%, 75%, 90%, etc.

In the present disclosure, the creation of the copy evident security feature may begin with the creation of a void pantograph. Upon reproduction (e.g., scanning or photocopying) the void pantograph reveals a covert feature, such as covert text or graphics. The void pantograph is formed from a first set of halftones and a second set of halftones, wherein at least one set of halftones is difficult to reproduce using reproduction methods such as scanning or photocopying. For example, upon reproduction the original printed elements of one set of the halftones may merge to form larger elements increasing the density of the replicated printed elements, or the original printed elements of one set of the halftones may drop-out of the reproduction, as they are not large enough to be reproduced. Processes for making void pantographs and examples of halftone elements are described, for example, in U.S. Pat. Nos. 4,227,720, 4,265,469, 4,310,180, 4,341,404, 5,018,767, 5,193,853, 5,707,083, 5,788,285, 6,000,728 7,307,761, 7,463,389, 8,164,799 and 9,738,106 for offset print and digital print processes, the teachings of which are incorporated herein by reference.

Figure 2:
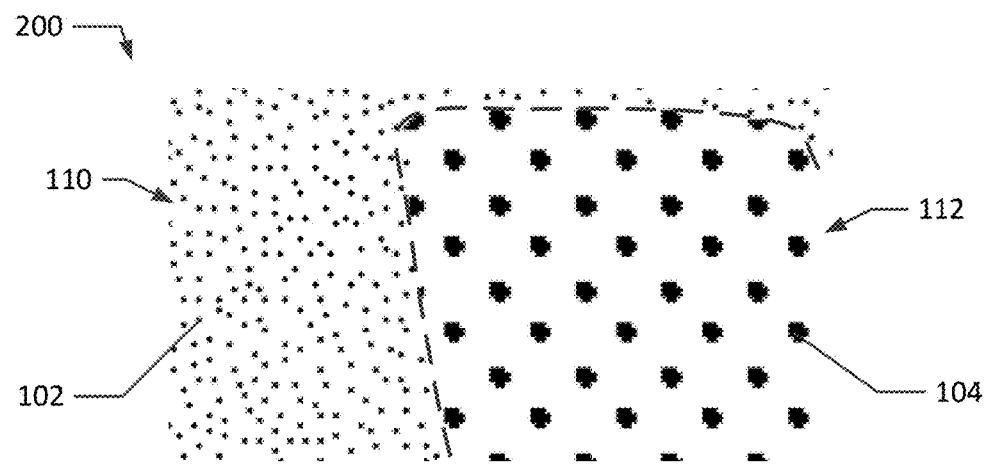
FIG. 2 is an embodiment of a void pantograph for example including two sets of halftone elements, which provide a copy evident security feature.

FIG. 2 illustrates an example of a void pantograph pattern 200, wherein the halftone elements 102, 104 are amplitude modulated, i.e., the first set of halftone elements 110 are smaller than the second set of halftone elements 112, which are separated by the dotted line for illustration purposes herein (however, as may be appreciated, the dotted line is not present on an actual pattern). In addition, the first set of halftone elements 102 are frequency modulated, wherein the first set of halftone elements are randomly positioned within a given area, wherein the area may be equivalent to, for example, a quarter of an inch squared, or a half inch squared, or an inch squared, and the second set of elements 104 are positioned according to a repeated pattern within a given area, wherein the area may be equivalent to, for example, a quarter of an inch squared, or a half inch squared, or an inch squared. Random placement of halftone elements may be executed using one or more algorithms, which may place the halftones based on the printing platform, the printing medium (ink, toner, etc.) and the document media (card stock, vellum, copy paper, etc.).

In the particular embodiment of FIG. 2, the void pantograph was formed as described in U.S. Pat. No. 7,307,761, using small, one (1) pixel, randomly placed dots in the first set of halftone elements (also referred to as the background) with larger, seven (7) pixels dots placed in uniform line angles (45 degrees from relative to the bottom edge of the paper) and at a frequency of 67 lines per inch between each row of elements. In this example, the halftones formed a printed density of 10%. As may be appreciated a pixel is understood as a single printed dot.

Figure 3:
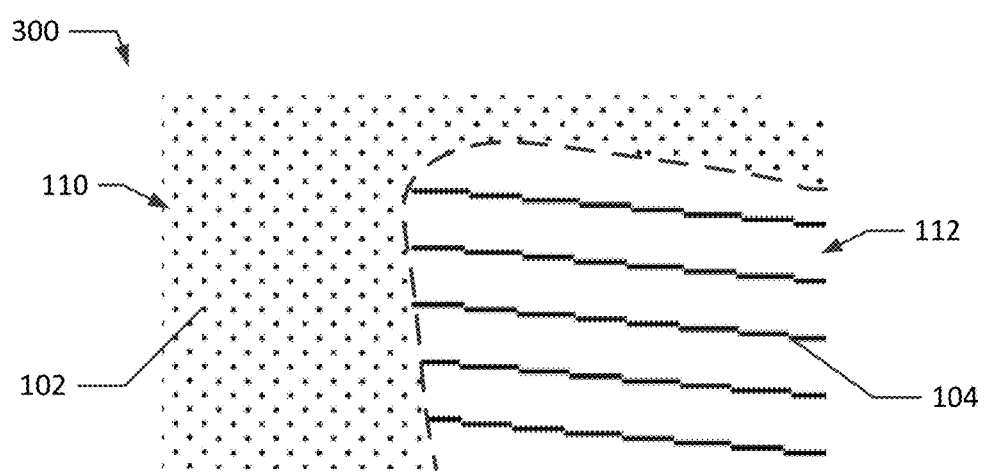
FIG. 3 is another embodiment of a void pantograph including two sets of halftone elements, which provide a copy evident security feature.

FIG. 3 illustrates another embodiment of a void pantograph pattern 200, wherein the halftone elements 102, 104 are different geometry, i.e., the first set of halftone elements 110 are dots and the second set of halftone elements 112 are continuous lines, which are separated by the dotted line for illustration (however, as may be appreciated the dotted line is not present on an actual pattern). Both sets of halftone elements are positioned according to a repeated pattern within a given area, wherein the area may be equivalent to, for example, a quarter of an inch squared, or a half inch squared, or an inch squared. In the illustrated embodiment, the pantograph is formed as described in U.S. Pat. No. 9,738,106 and the smaller, two (2) pixels dots of the first set of halftone elements (in this case the background) were place uniformly in lines placed at a 45 degree angle from the bottom edge of the paper and a line frequency of 150 lines per inch and the larger lines were placed in uniformly spaced, one (1) pixel thick lines provided at an angle of 5 degrees from the edge of the paper and at a frequency of 50 lines per inch (in this case the foreground).

Various combinations of halftone element placing, geometry and size may be utilized. As noted above, placement may be uniform, random or both. The elements may be formed from dots, diamonds, ellipse, squares, crosses or lines, such as continuous lines, broken lines, wavy lines or dashes. Preferably, one set of the elements are sized so that they either cannot be reproduced as they are too small to be reproduced by reproduction equipment or sized so that they merge when reproduced by reproduction equipment. More preferably, one set of halftone elements are sized such that they are reproduced by the reproduction equipment as the elements appear on the original. In the above examples, the second set of halftone elements 104 are sized such that they may be reproduced by the reproduction equipment (although their geometry may be somewhat altered). Then at least one set of halftone elements are adjusted in size and amount to allow the elements to blend.

In the above examples, by adjusting the density, i.e., the amount, of small elements of the background area (the first set of elements 102) to match them to the elements of the foreground area (the second set of elements 104), the background and foreground areas may be matched to blend them together. The adjustment of the density will affect the perceived tints of the halftone elements. The void pantograph may be formed using any graphics program that may format the void pantograph as a bitmap art file. Example of graphics programs include those offered by ADOBE, COREL, PAINT.NET, etc.

In order to adjust the two (or more) sets of halftone elements printed on a specified printer, such that the two sets (or more) of halftone elements look similar to the unaided eye (i.e., provide a tint for each set of halftone elements that blend the elements together such that they are relatively indistinguishable), a calibration process must be conducted prior to the creation of the final void pantograph bitmap file. Accordingly, the void pantographs are calibrated to the printing platform, such as a particular model of printer (including laser jet, toner or production press printers), and are preferably calibrated to a specific printer. The calibration process is a function of adjusting the programmed density of the halftone areas 110, 112 with the printed density and resulting tints of the halftone areas so that the printed density (and tints) of the halftone areas match.

Figure 4:
FIG. 4 is an embodiment of a calibration sheet.

Density is understood as the percentage of a given area of a document covered in the printing medium. For example, a density of 10% results in 10% of a given area being covered in the printing medium (i.e. ink, toner, etc.), wherein the area may be determined, e.g., by square inches or square centimeters, etc. As alluded to above, the programmed density, i.e., the density selected in the software, may vary from the printed density, i.e., the actual density that the printer provides, which causes the variation in the perceived tints. Calibration, therefore, allows for independent selection of the density of each set of the halftone elements to provide a relatively more uniform tint between the two areas. To calibrate, void pantographs including halftone elements presented at varying densities are printed on a sheet of paper using the printing platform, and preferably the specific printer on which the copy evident document will be produced, as illustrated in FIG. 4. In the case of printers that print in a single color such as a black and white printer, the calibration sheet may be printed with only black ink or toner. In the case of color printers that print in multiple colors (CMYK—Cyan, Magenta, Yellow, Black color ink or toner), multiple calibration sheets may be printed with one color, more than one color or all of the colors, or a single calibration sheet may be printed with one color, more than one color or all of the colors.

In the embodiment of the calibration sheet 400 of FIG. 4, the covert features 120 of the calibration void pantographs 100 are a series of letters provided by a second set of halftone elements, forming the foreground area 112, surrounded by a first set of halftone elements, forming the background 110; however, other letters, numbers, or shapes of varying geometries may be utilized as the covert features. Also, in this embodiment, the density of the halftone elements providing the foreground 112 (i.e., the covert features 120) is varied from 8% to 20% from left to right in each row and the density of the background halftone elements is varied from 4% to 30% from left to right in each row. The void pantographs of the calibration sheet 400 are delivered to the printer in the format of a bitmap file, wherein the printer does not utilize the on-board (i.e., in the printer) raster image processor (RIP) or the RIP of the operating system.

Generally, raster image processing is a process and a means of converting digital information of a source image, such as a PostScript file, into half-tone screens before it is printed by the printer. A RIP can be implemented either as a software component of an operating systems or as a firmware program executed on a microprocessor inside a printer. In the present method, a bitmap file is sent to the printer and the RIP of either the operating system or the printer is not used to determine the size and position of each halftone element to reflect the density you wish to achieve on the printed document. The bitmap file is printed onto a document, where the position and size of each halftone elements is already determined by the bitmap file.

If a regular continuous tone graphic source file is sent to the printer, e.g., a 10% grayscale file, the RIP is needed to interpret the densities within the continuous tone of the source file and print the source file based on proprietary algorithms set by the printer manufacturer to resemble what a 10% grayscale should look like on the printed document. Each printer's RIP is different in how it is programmed by the printer manufacturer and thus sending a 10% continuous tone source file to various inkjet and toner printers will create variations in the printed images and look different depending on the make and model of the printers.

However, sending a 10% bitmap source file to various inkjet and toner printers will provide printed documents that look similar with relatively little variance between different printers. The void pantograph is delivered to the printer as an electronic bitmap file. The printed calibration sheets 400 are then examined by visual observation of the original document by a user to determine which combination of foreground (first set) halftone elements and background (second set) halftone elements blend together (and preferably the best blend determined by the observer) so that the covert features 120 (i.e., the letters) are difficult to discern from the background or better blend into the background.

On a printed document, the halftone elements 102, 104 are formed by depositing the printing medium (toner, ink, dye, pigments, etc.) as elements (dots or other geometric shapes) on the printed document. The halftones provide the covert copy evident feature, which appears when the document is reproduced. Such covert features often include the terms "Copy", "Void", "Invalid", etc. However, other covert features are possible, such as embedded images like logos. Additional sets of halftones may also be present.

Figure 5A:
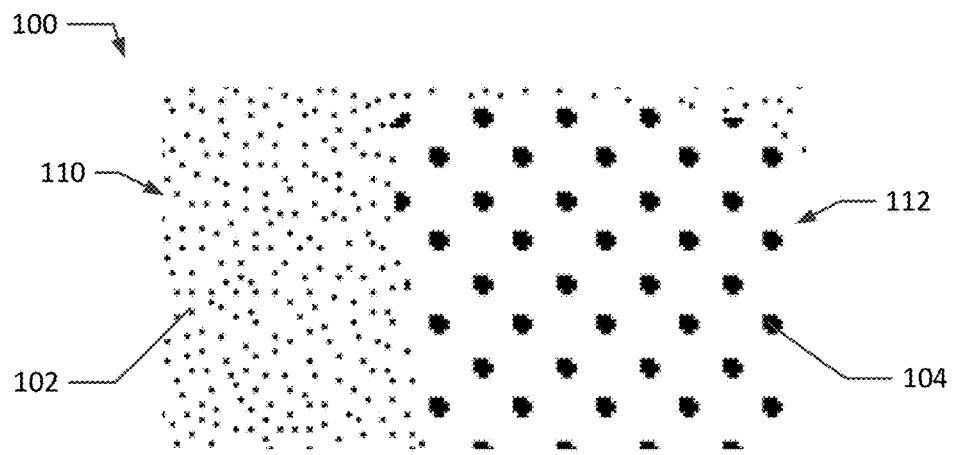
FIG. 5a is an embodiment of a void pantograph including two sets of halftone elements.
Figure 5B:
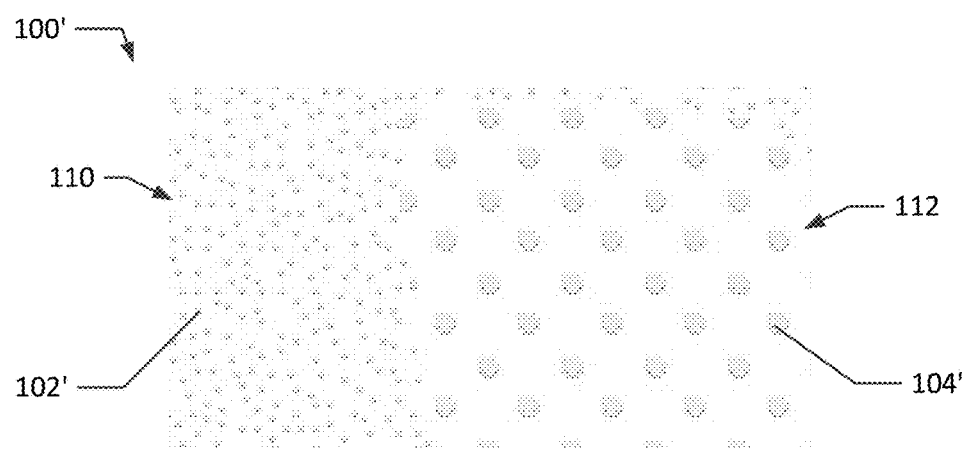
FIG. 5b is an embodiment of the void pantograph of FIG. 5a converted into an overlay including two sets of halftone holes.

A combination of foreground (first set) halftone elements and background (second set) halftone elements that blend together is identified so that the covert features 120 (i.e., the letters) are difficult to discern from the background. To create the overlay, the halftone elements from this combination are then converted to holes, or halftone holes, and the remaining portion of the overlay is set to white. Without being bound to a particular theory, the halftone holes, in essence, become "transparent" in the overlay like holes in a lace material. A close-up of a calibrated void pantograph 100 before conversion to an overlay is illustrated in FIG. 5*a*. While the halftone elements 102, 104 are illustrated in black, in this image the halftone elements are presented at 10% density leaving 90% of the area white. The void pantograph 100', after conversion, is illustrated in FIG. 5*b*. The halftone elements 102', 104' are illustrated in the figure as a light gray; however, they are halftone holes in the white overlay and are located where the black halftone elements were initially formed. If one was to print the overlay by itself, the image would be blank as printers, generally, do not print the white portions an image (in this case, the overlay) and the halftone holes are locations where the bitmap is transparent. Like the halftone elements of the void pantograph of FIG. 5*a*, the halftone holes are present at 10% density, leaving 90% of the area covered by the white overlay and, therefore, white.

Figure 6A:
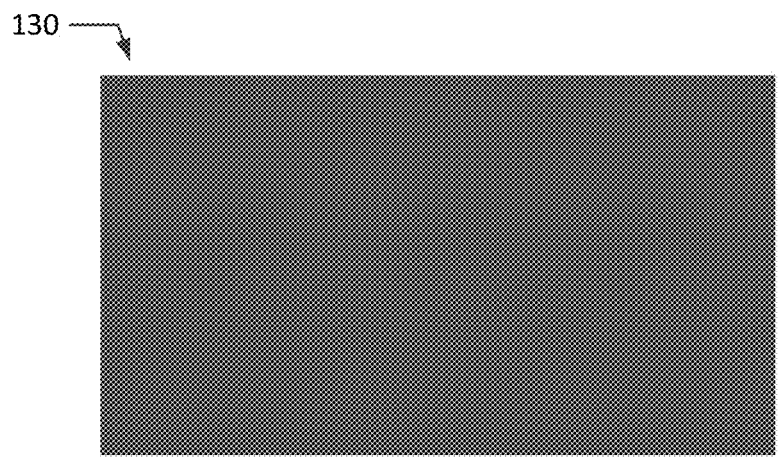
FIG. 6a is an embodiment of a solid background that is a continuous single color tone image.

FIGS. 6*a* through 6*d* provide an illustrative example. FIG. 6*a* illustrates a solid continuous tone "red" background image 130 generated by using any photo/graphics editing/designing software such as but not limited to Adobe Photoshop to create a file and colorizing it with the desired "red" by assigning each pixel color area in the file as a CMYK (cyan, magenta, yellow and black) percentage. In this example, Photoshop was used to create a one color continuous "red" using "PMS Pantone Warm Red C". Photoshop created this color using a CMYK breakdown of 0% cyan, 88% magenta, 80% yellow, 0% black. The information tells the RIP of the printer, in order to create the desired "red" on the printed document, the printer will print the "red" with the above defined percentages of cyan, magenta, yellow and black ink or toner for each pixel area within the file to reproduce the "PMS Pantone Warm Red C" on the printed document.

Figure 6B:
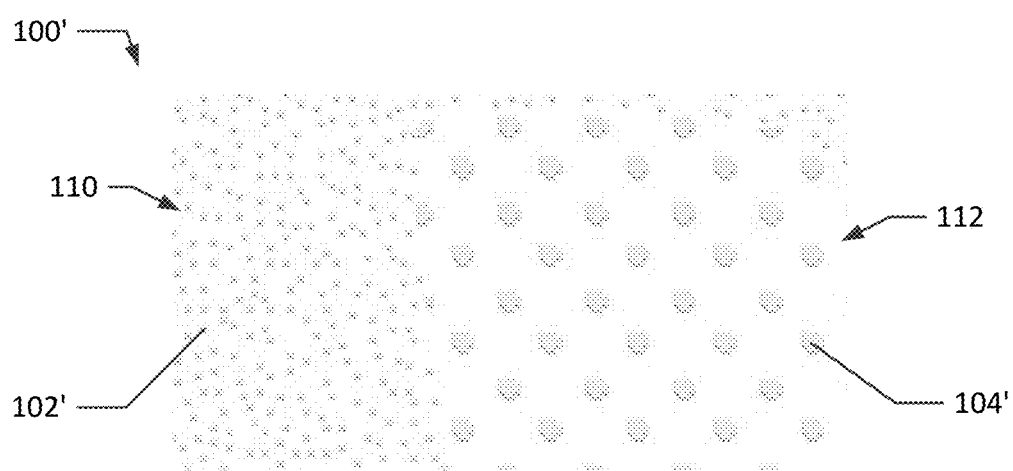
FIG. 6b is an embodiment of an overlay including two sets of halftone holes.
Figure 6C:
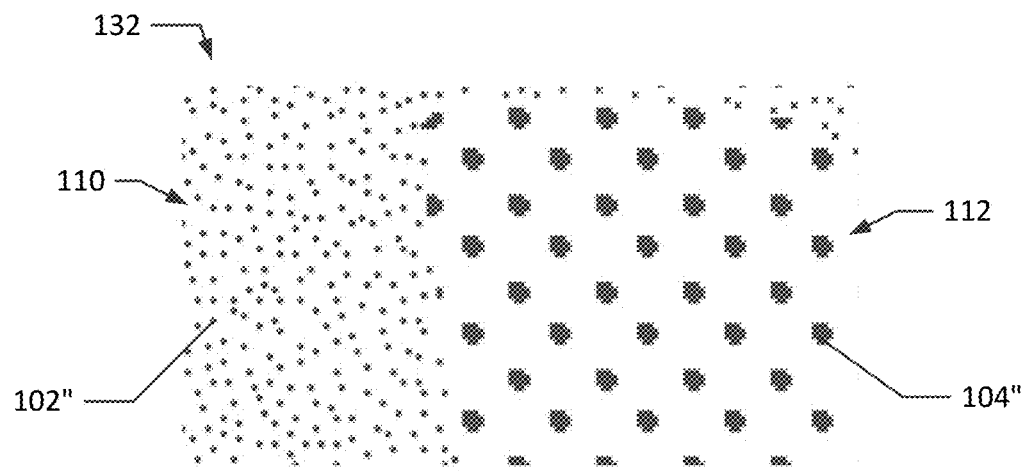
FIG. 6c is a close-up of a merged image of the overlay of FIG. 6b and the background image of FIG. 6a, including two sets of colorized halftone holes.
Figure 6D:
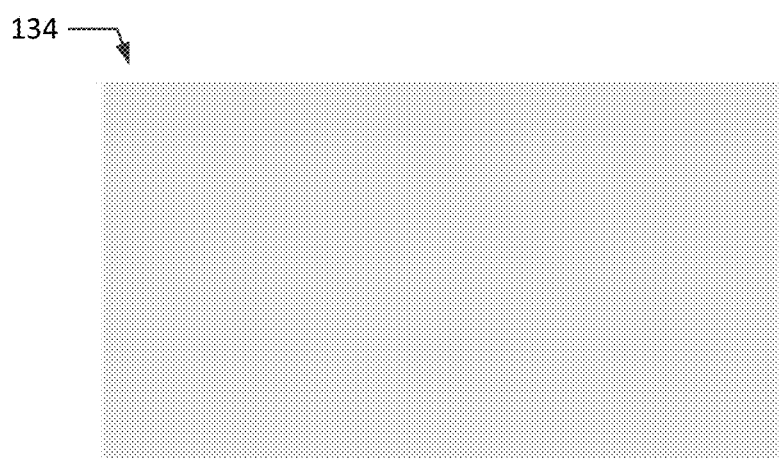
FIG. 6d is the merged image of FIG. 6c, providing a muted screen down version of the original background FIG. 6a incorporating the copy-evident security feature.

FIG. 6*b* illustrates a magnified area of an overlay, i.e., the converted void pantograph 100' including two sets of halftone holes 102', 104' and is the same as illustrated in FIG. 5*b*. FIG. 6*c* illustrates a close-up of the merged image 132 of the background image of FIG. 6*a* and the overlay of FIG. 6*b*. As can be seen, the merged image includes colorized halftone holes 102", 104", where the "red" color of the background image "underneath" the halftone holes is exposed through the halftone hole locations as shown in FIG. 6*c*. FIG. 6*d* is the merged file 134 representing a muted version (reduced density) of FIG. 6*a*. As illustrated, upon printing, the printer leaves the "white" regions unprinted and places the colors of the background image in the "hole" regions.

Unlike the overlay, the colors of the hole regions will be interpolated by the printer's RIP to print using CMYK ink or toner based on the breakdown is defined as 0% cyan, 88% magenta, 80% yellow, 0% black. In this example, the programmed and calibrated density for both sets of halftone elements was 10%. FIG. 6*d* represents a 10% density of the original "red" color and in this case to resemble 10% of "Pantone Warm Red C". FIG. 6*d* also represents a muted version of FIG. 6*a* embedded with the copy-evident security feature.

Figure 7A:
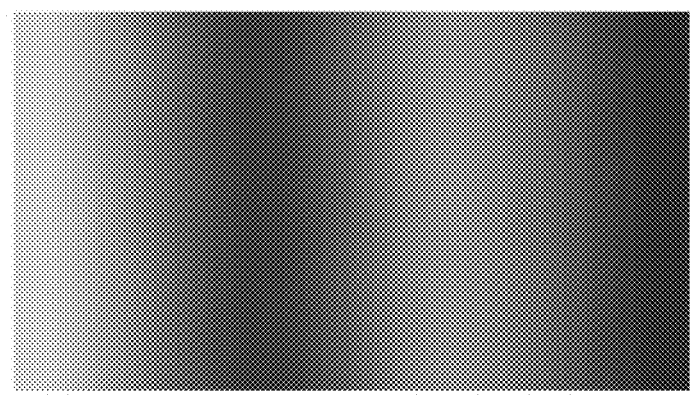
FIG. 7a is an embodiment of a solid background image that is a continuous multiple color tone image.

FIGS. 7*a* through 7*d* provide a further illustrative example. FIG. 7*a* illustrates a solid continuous "rainbow colors" background image 130 generated by using any photo/graphics editing/designing software such as, but not limited to, Adobe Photoshop to create a colorized file with the gradient tool. The desired blend of "rainbow colors" is defined in each pixel color area as CMYK (cyan, magenta, yellow and black) percentages to create the continuous tone "rainbow colors" background image. In this example, one of the pixel areas may be a "yellow" with the CMYK breakdown as 1% cyan, 3% magenta, 100% yellow, 0% black, and another pixel areas may be a "purple" with the CMYK breakdown as 69% cyan, 93% magenta, 32% yellow, 15% black and so on. The information tells the RIP of the printer, in order to create the desired colors in the "rainbow colors" on the printed document, the printer will print the "rainbow colors" with the above defined percentages of cyan, magenta, yellow and black ink or toner for each pixel area within the file to achieve the desired "rainbow colors" on the printed document.

Figure 7B:
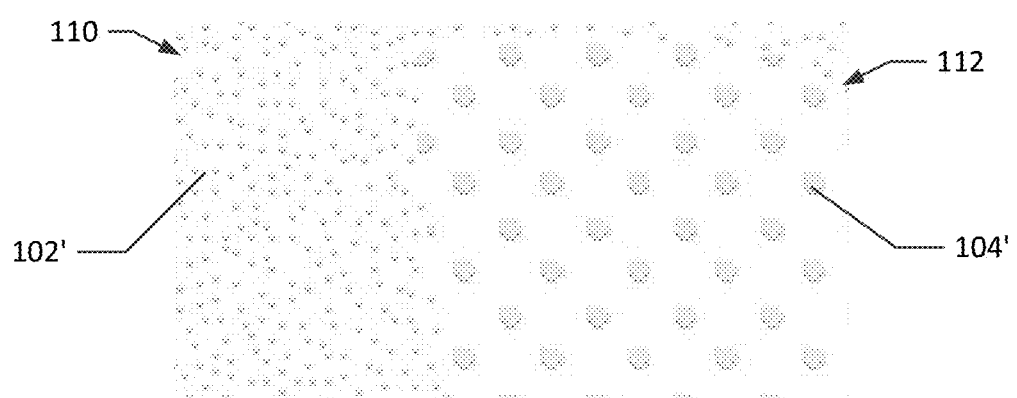
FIG. 7b is an embodiment of an overlay including two sets of halftone holes.
Figure 7C:
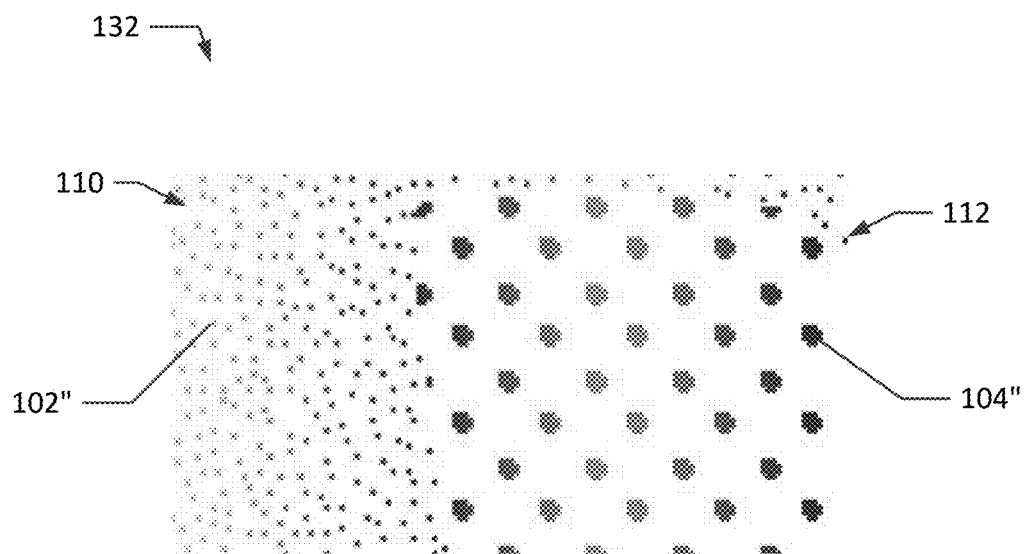
FIG. 7c is a close-up of a merged image of the overlay of FIG. 7b and the background image of FIG. 7a, including two sets of colorized halftone holes.
Figure 7D:
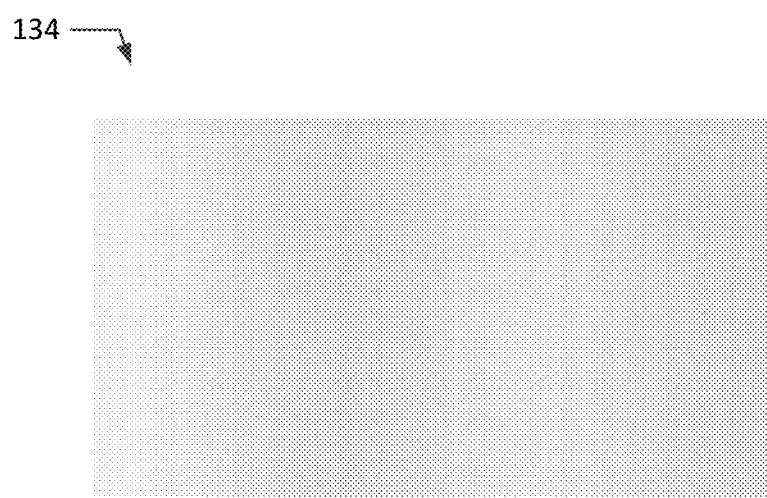
FIG. 7d is the merged image of FIG. 7c, providing a muted screen down version of the original background FIG. 7a with the copy-evident security feature.

The overlay pattern 100' is provided in FIG. 7*b*, again, including the two sets of halftone elements 102', 104' illustrated in FIG. 5*b*. A close-up of the merged image 132 of the overlay and rainbow colors image of FIG. 7*a* are illustrated in FIG. 7*c*. As can be seen, the merged image includes colorized halftone holes 102", 104", where the "rainbow colors" are that of the background image in FIG. 7*a* being exposed through the halftone hole locations as shown in FIG. 7*c*. FIG. 7*d* illustrates the image of the merged file 134 representing a muted version of FIG. 7*a*. As illustrated, upon printing, the printer leaves the "white" regions unprinted and places the colors of the background image in the "hole" regions. The colors of the background image will be interpolated by the printer's RIP to print using CMYK ink or toner based on the CMYK breakdowns. Similar to the example of FIGS. 6*a* through 6*d*, the density of the image is programmed and calibrated to be 10% density of the original "rainbow" gradient colors in FIG. 7*a*. FIG. 7*d* also represents a muted version of FIG. 7*a* embedded with the copy-evident security feature.

Figure 8A:
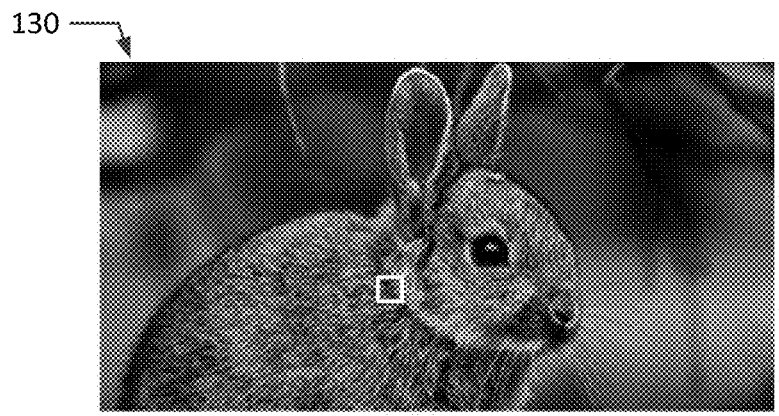
FIG. 8a is an embodiment of a background continuous color photographic image.

FIGS. 8*a* through 8*f* illustrate yet another example. FIG. 8*a* illustrates a continuous background image 130 depicting a photograph of a bunny. This background image 130 was provided by a digital photograph in any photo format such as but not limited to jpeg, tiff, png, gif, etc. In this example, each pixel area is individually defined and may be a "green" with the CMYK breakdown as 66% cyan, 39% magenta, 100% yellow, 20% black; a "blue" with the CMYK breakdown as 100% cyan, 19% magenta, 26% yellow, 1% black; and so on. The information tells the RIP of the printer, in order to create the desired colors in the "bunny photograph" on the printed document, the printer must print the "bunny photograph" with the above defined percentages of cyan, magenta, yellow and black ink or toner for each pixel area within the file to achieve the desired "bunny photograph" on the printed document.

Figure 8B:
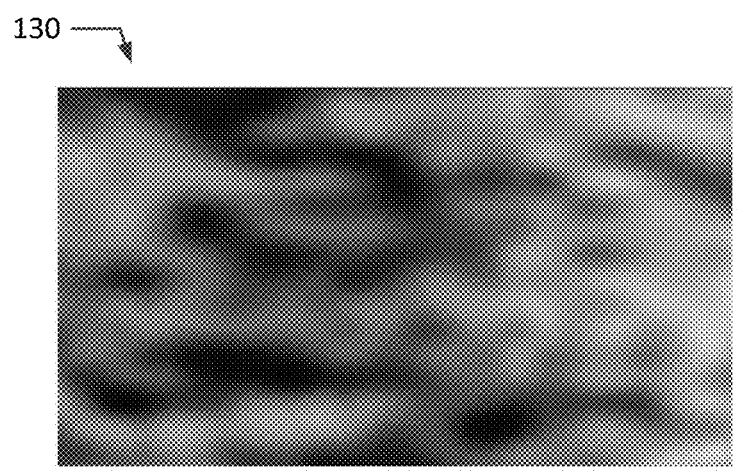
FIG. 8b is a close-up of the boxed region of the background continuous color photographic image.
Figure 8C:
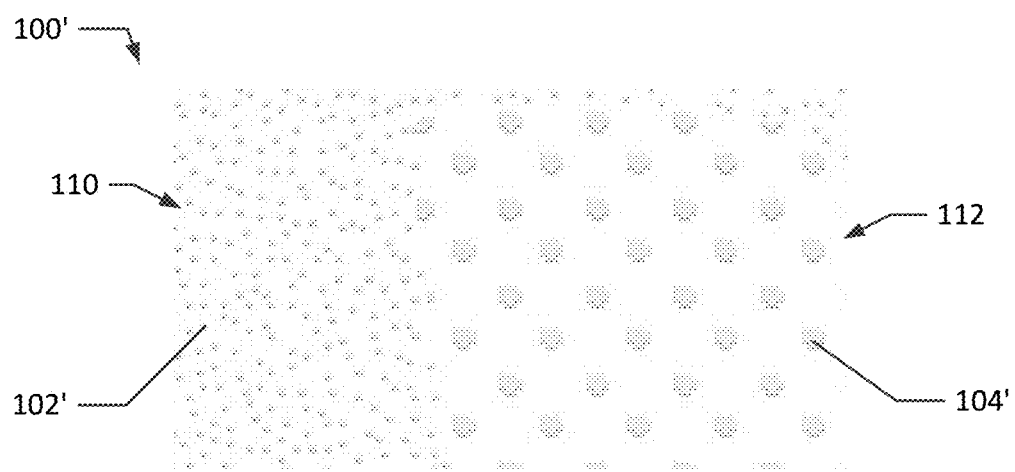
FIG. 8c is an embodiment of an overlay including two sets of halftone holes.
Figure 8D:
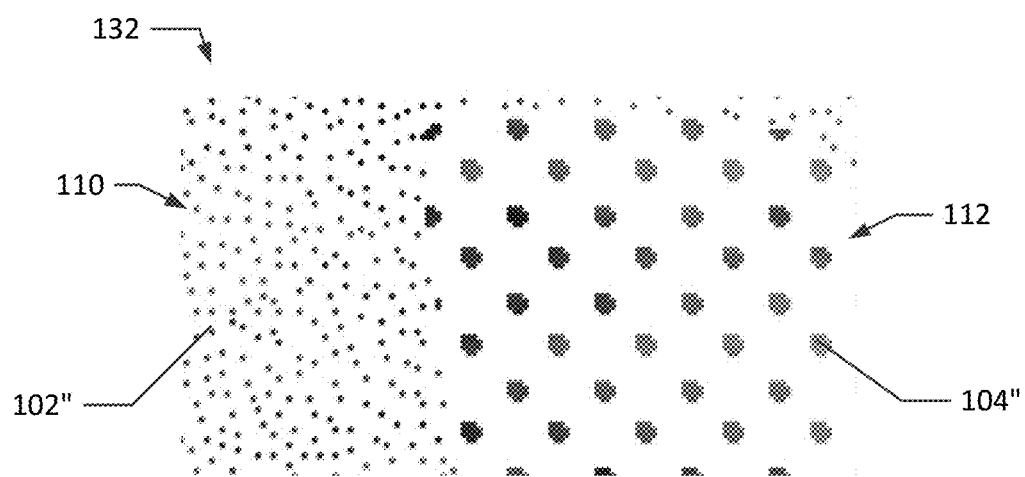
FIG. 8d is a close-up of a merged image of the overlay of FIG. 8c and the background image of FIG. 8a, 8b, including two sets of colorized halftone holes.
Figure 8E:
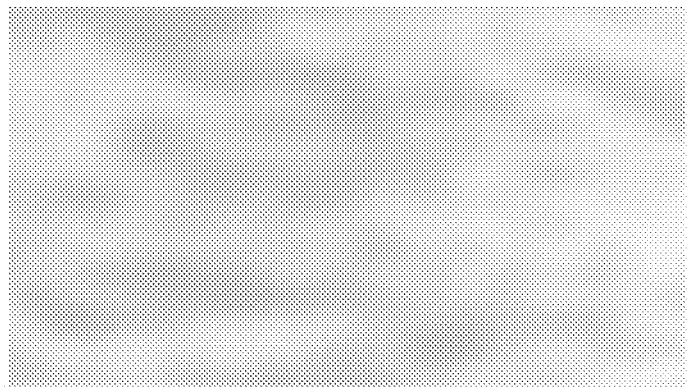
FIG. 8e is a close-up of merged image of FIG. 8d, providing a close-up muted screen down version of the original background FIG. 8b with the copy-evident security feature.
Figure 8F:
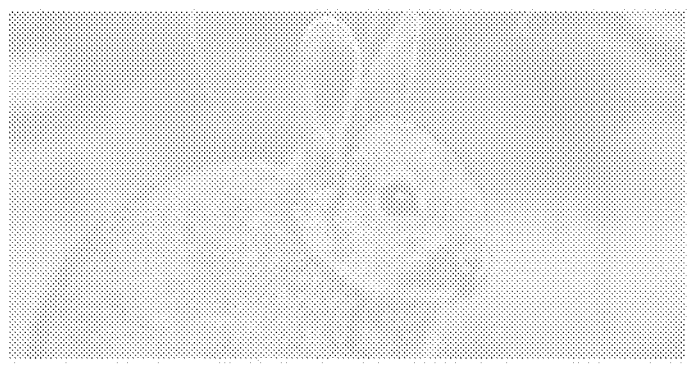
FIG. 8f is the merged image of FIG. 8a with an overlay including two sets of halftone holes, providing a muted screen down version of the original background FIG. 8a, with copy-evident security feature.

FIG. 8*b* illustrates a magnified close-up section of FIG. 8*a*. FIG. 8*c* illustrates a close-up of the overlay pattern 100' including the two sets of halftone holes 102', 104'. FIG. 8*d* illustrates a close-up of the merged image 132 including the overlay FIG. 8*c* and background file FIG. 8*b*. As can be seen, the merged image includes colorized halftone holes 102", 104", where the colors are that of the background image at the halftone hole locations. FIG. 8*f* is the merged file 134 representing a muted version of FIG. 8*a*. FIG. 8*e* illustrates a magnified close-up section of FIG. 8*f*. As illustrated, upon printing, the printer leaves the "white" regions unprinted and places the colors of the background image in the "hole" regions, which "hole" regions will be interpolated by the printer's RIP to print using CMYK ink or toner based on the CMYK breakdowns.

Similar to the example of FIGS. 6*a* through 6*d*, the density of the image is programmed and calibrated to be 10% density of the original "bunny photograph" in FIG. 8*a* and FIG. 8*b*. FIG. 8*f* and FIG. 8*e* also respectively represent a muted version of FIG. 8*a* and FIG. 8*b* embedded with the copy-evident security feature.

As may be appreciated from the above, the background image may be supplied by a number of sources including, e.g., solid color files, multiple color files, and full color, continuous tone images, such as photographic and other graphic art. File formats include, but are not limited to, JPEG, JFIF, Exif, Tiff, GIF, BMP, PNG, PPM, WebP, HDR, BAT, BPG, etc. Furthermore, while the examples utilized a halftone element, halftone holes density and colorized halftone holes density of 10% (i.e., 10% of a given printed area being covered with the printing medium) a density of 4% to 40% may be utilized, including all values and ranges therein, such as 4% to 20%, 8% to 20%, and 10% to 12% etc. It may be appreciated that, if a density of 10% of the sets of halftone elements is selected in the original void pantograph, the density of the merged image before printing will also be 10%.

Figure 9:
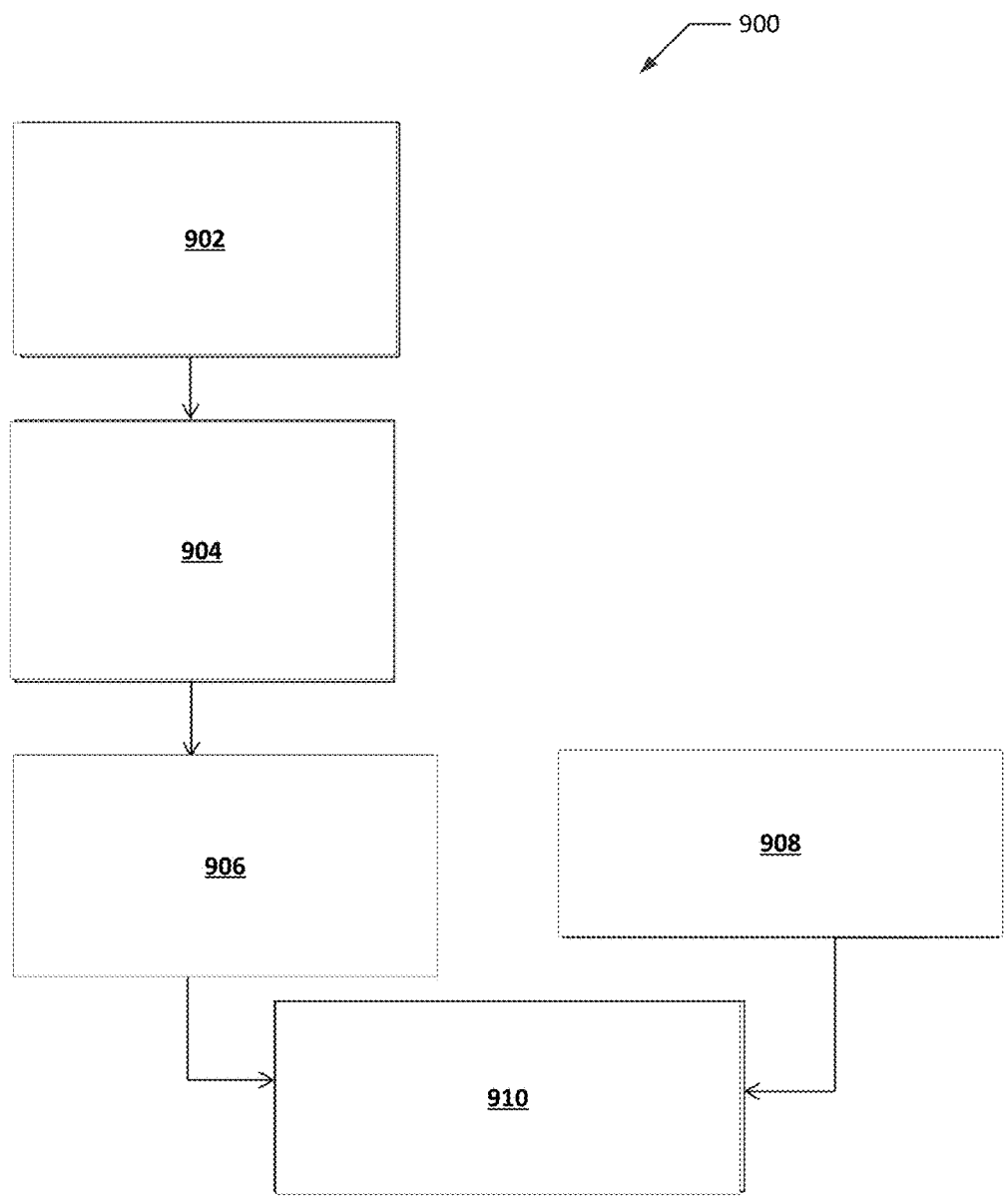
FIG. 9 is an embodiment of a process of creating a copy-evident security feature.

An embodiment of a process for forming a copy evident document is illustrated in FIG. 9. The process 900 includes creating a void pantograph 902 as, preferably, a one (1) bit bitmap electronic file using graphic programs from, for example, ADOBE, COREL, MICROSOFT, PAINT.NET, etc. The resolution of the file is preferably equal to or a factor of the printer resolution, commonly expressed in dots per inch, e.g., 600 dpi, 300 dpi, etc. The void pantograph is then calibrated 904, as described above, to a printer model or a specific printer, wherein the background and foreground halftone elements (first and second set of halftone elements) are adjusted until the background and foreground tints are found by the observer to match.

The overlay, "top layer", is then created by converting the halftone elements into halftone holes 906 and the file is stored as a bitmap file and, preferably, a one (1) bit bitmap file. The bottom layer, i.e., background image, may then be selected 908 from, e.g., a) a single continuous one color image, b) a continuous multiple color image c) a color photograph/graphics image at any resolution or a combination thereof. Within a), b), c) noted above, it can also include an identifier such as alpha and/or numeric number and/or a hashcode, as described above, in a separate or different color than its surrounding color as part of the background image. This background image may be at any resolution and does not need to be a factor of the printer resolution. The overlay file and the background image may then be merged together 910 before printing to be saved and stored on a file storage system. This merged file, including the copy evident feature, may be saved in a number of file formats, including but not limited to .pdf, .tiff, .jpeg, .ovl, .aft, .png, .gif, etc. and stored in a physical memory storage location, such as a CPU, random access memory, etc.

However, the overlay file and the background image may also be merged together 910 during the printing process by a document print management program, wherein the overlay covers the background image in the solid white areas, except for where the halftone holes are present. The resulting printed document will include the copy evident feature. This process, therefore, provides variable security as a single overlay file can be combined with a variety of background images. In other embodiments, multiple overlay images may be used with multiple background images in a single print cue. Stated another way, for example, from ten background files and ten overlay files one hundred combinations of the copy evident feature may be generated and any number of them presented on each page of a printed document. The resulting printed document will include variable copy evident features with each page or sections of a page in the document having a variable copy evident feature.

Figure 10:
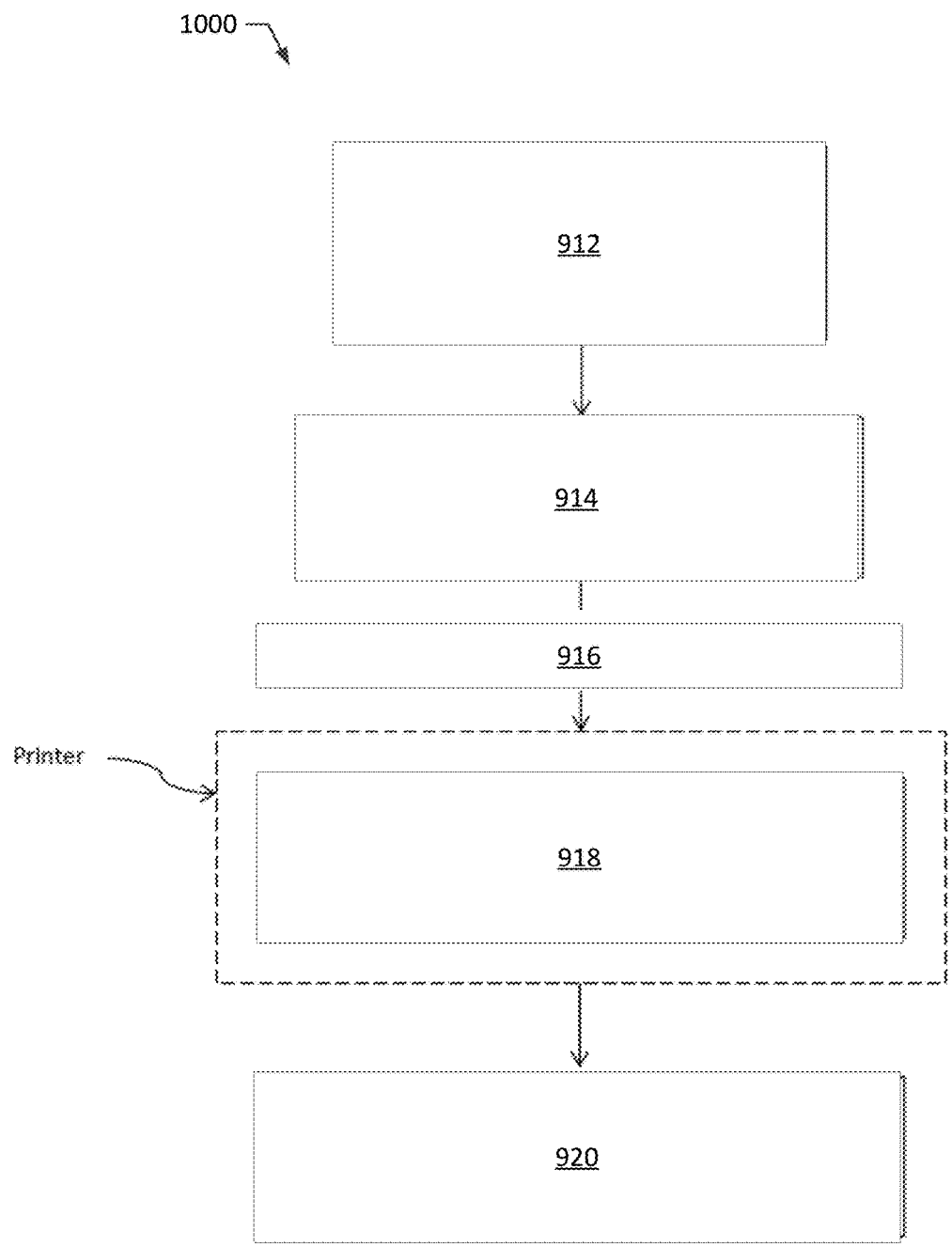
FIG. 10 is an embodiment of a process of incorporating the copy-evident security feature into a document.

Turning to FIG. 10, the process 1000 of merging the copy-evident feature with variable data and printing is illustrated. First, the variable data is prepared 912. Variable data includes the information that is readily observed by the casual observer, as well as other data that may be observed by trained observers. Such data may include the information printed on a check including the account information and the check amount, prescription information including the prescribing doctor/clinic and the script itself, deed information, etc. The variable data may also include additional graphics such as a business's trademarks, a digitally saved signature, plan illustrations, graphic images, or photographic images, etc. The variable data may be generated with any document or graphics software, such as word processing software, accounting software, prescription software, etc.

The variable data and the copy-evident feature may be merged 914 by, e.g., importing the copy-evident feature file as an additional graphic element behind the variable data, as a background image or a watermark. The merged files are then, at 916, either sent to the printing platform or stored in computer storage memory or on a storage device for later printing. When sent to the printing platform 918, the printer's raster image processor will rasterize the merged file according to the "on-board" printer RIP and place the printing medium only at areas where the printer determines that the merged image is not "white" in the overlay, i.e., creating the colorized halftone holes. Upon printing 920, the result is a printed document with variable data (including text, graphics or both text and graphics) along with a color, and preferably a full color image, void pantograph background/watermark, providing a copy-evident and anti-tamper document on print media.

Figure 12:
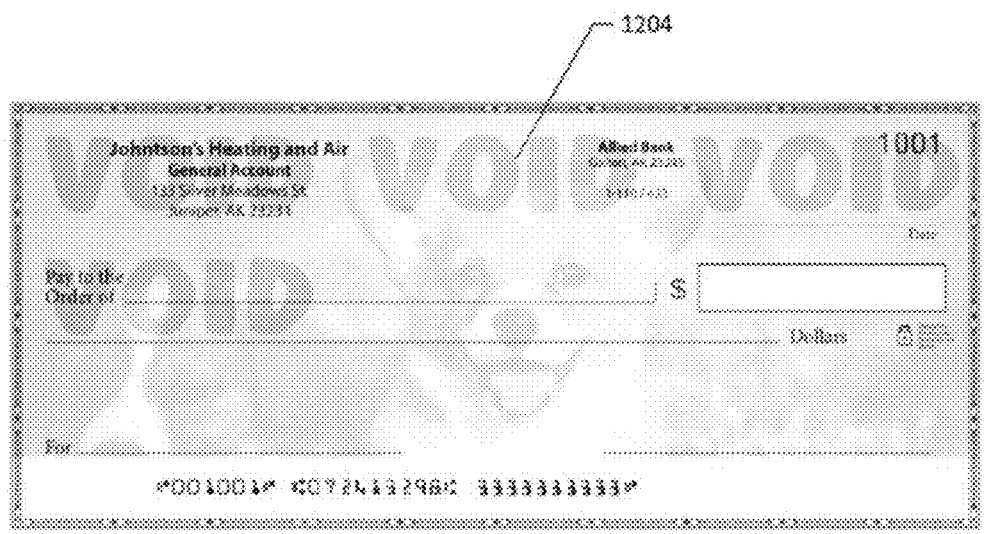
FIG. 12 is an embodiment of a photocopy of FIG. 11.

An example of a merged document including a full color, digitally printed copy evident feature is illustrated in FIG. 11. The document 1100 is a check and includes variable text 1102a, 1102b, 1102c, etc. printed over the copy-evident feature 1104, i.e., a photograph of a dog. Upon reproduction, such as photocopying, the copy-evident feature 1104 reveals one or more covert features. In this case the covert features 1204, the word "VOID" is illustrated in FIG. 12, which is an example of a photocopy of the original illustrated in FIG. 11. In addition, this example includes additional security features on the document, such as a verification grid display as the term "payable" in the check amount box 1106, a microprint signature line 1108, and guilloche patterns around the check border 1110, which further increase document security.

The foregoing description of several methods and embodiments has been presented for purposes of illustration by using a security feature such as a void pantograph. This same methods and embodiment can be use of other by not limiting security feature such as covert hidden feature know as HALO offered by Arcis Solutions Inc. It is not intended to be exhaustive or to limit to the precise steps and/or forms disclosed, and obviously many modifications and variations are possible in light of the above teaching.

In an aspect, the present disclosure relates to a method of printing a copy evident document including an overlay and a background image. The method includes creating a void pantograph with at least two sets of halftone elements. An overlay is then formed, wherein the halftone element locations of the void pantograph are converted to holes in a solid white image. The overlay is then merged with a background image, wherein the background image is visible at the hole locations of the overlay when printed. The merged overlay and background image are then printed, wherein the portions of the background image that are printed are printed at locations where the holes are present in the overlay image. In the solid white regions of the overlay, the printer does not print the background image. Preferably, the overlay is provided to the printer or print management software as a bitmap and is not rasterized by the on-board printer software. In another aspect, the present disclosure relates to a document formed by the above described methods and methods of authenticating documents including the copy evident features formed according to the above described methods.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method of printing a copy evident document, comprising:
    creating a void pantograph including a first set of halftone elements and a second set of halftone elements different in modulation from said first set of halftone elements;
    forming an overlay including a solid white image with a plurality of halftone hole locations, wherein said halftone elements of said void pantograph are converted to said plurality of halftone hole locations;
    merging said overlay with a background image, such that portions of said background image are visible at said halftone hole locations of said overlay when printed;
    printing said merged image on print media, wherein said portions of the background image that are printed are printed at locations where said holes locations are present in said overlay creating a copy-evident feature.

2. The method of claim 1, wherein said background image is not printed in said white regions of said overlay.

3. The method of claim 1, wherein the void pantograph forming said overlay is provided to a printer as a bitmap and is not rasterized by an on-board printer software program of said printer to determine the halftone hole locations.

4. The method of claim 1, wherein said overlay is provided to a print management software program as a bitmap and is not rasterized by said print management software program.

5. The method of claim 1, further comprising calibrating said void pantograph, wherein said void pantograph is calibrated by:
    printing a calibration sheet including a plurality of said void pantographs wherein said void pantographs include different density combinations of said sets of halftone elements;

selecting one of said void pantographs to form said overlay, wherein said sets of halftone elements form a blended on said calibration sheet.

6. The method of claim 1, wherein said copy-evident document includes text or graphics that selected from static, variable and combinations thereof, appearing over said copy-evident feature.

7. The method of claim 1, wherein said background image includes one or more of the following: a single color, a single tone, multiple colors, multiple tones, and a full color photographic image.

8. The method of claim 1, wherein at least one of said sets of halftone elements exhibit a density in the range of 4% to 40% and said merged image exhibits a density of 4% to 40%.

9. The method of claim 1, wherein said overlay is provided at a resolution equal to or a factor of a resolution of said printer and said background image is provided at any resolution.

10. The method of claim 1, wherein said overlay covers a portion of said document.

11. The method of claim 1, wherein said background image is provided in one of the following file formats: JPEG, JFIF, Exif, Tiff, GIF, BMP, PNG, PPM, WebP, HDR, BAT and BPA and said overlay is a bitmap file.

12. A method of printing a copy evident document, comprising:
   printing a plurality of visible portions of a background image merged with a overlay on a document, wherein said visible portions of said background image are defined by a first set of halftone holes and a second set of halftone holes different in modulation from said first set of halftone holes in said overlay and said visible portions of said background image provide a copy-evident feature on said document.

13. The method of claim 12, wherein said first set of halftone holes and said second set of halftone holes of the void pantograph are transparent regions in said overlay.

14. The method of claim 12, wherein said first set of halftone holes and said second set of halftone holes are formed by a first set of halftone elements and a second set of halftone elements in a void pantograph.

15. The method of claim 12, further comprising sending a bitmap graphic file including said overlay to a printer; sending one of a plurality of background image files including said background image to said printer; and merging said bitmap graphic file with said background image file.

16. A copy-evident document including a covert-security feature comprising:
   a merged image printed on a document, wherein said merged image includes a background image and an overlay wherein said overlay includes a first set of halftone holes and a second set of halftone holes different in modulation from said first set of halftone holes and portions of said background image is printed where said first and second sets of halftone holes are present in said overlay.

17. The copy-evident document of claim 16, wherein said first and second sets of halftone holes form a void pantograph.

18. The copy-evident document of claim 16, wherein said background image is one or more of the following: a single color, a single tone, multiple colors, multiple tones, and a full color photographic full color image.

19. The copy-evident document of claim 16, further comprising at least one of visible text and graphics printed over said cover-security feature.

20. The copy-evident document of claim 16, wherein said merged image exhibits a density of 4% to 40%.

* * * * *